US011748784B2

(12) United States Patent
Lawbaugh et al.

(10) Patent No.: US 11,748,784 B2
(45) Date of Patent: Sep. 5, 2023

(54) USER CONTROL OF ANONYMIZED PROFILING DATA USING PUBLIC AND PRIVATE BLOCKCHAINS IN AN ELECTRONIC AD MARKETPLACE

(71) Applicant: Concord Technologies Inc., Portland, OR (US)

(72) Inventors: Paul Lawbaugh, Hillsboro, OR (US); Dashiell Lavine, Portland, OR (US)

(73) Assignee: Concord Technologies Inc., Portland, OR (US)

( * ) Notice: Subject to any disclaimer, the term of this patent is extended or adjusted under 35 U.S.C. 154(b) by 0 days.

(21) Appl. No.: 17/361,157

(22) Filed: Jun. 28, 2021

(65) Prior Publication Data

US 2021/0326934 A1     Oct. 21, 2021

Related U.S. Application Data

(62) Division of application No. 15/995,158, filed on Jun. 1, 2018, now Pat. No. 11,049,148.

(51) Int. Cl.
*G06Q 30/02*       (2023.01)
*G06Q 30/0251*    (2023.01)
(Continued)

(52) U.S. Cl.
CPC ..... *G06Q 30/0269* (2013.01); *G06Q 30/0254* (2013.01); *G06Q 30/0277* (2013.01);
(Continued)

(58) Field of Classification Search
CPC ........... G06Q 30/0269; G06Q 30/0254; G06Q 30/0277; G06Q 30/0215; G06Q 30/0236;
(Continued)

(56) References Cited

U.S. PATENT DOCUMENTS 5,855,008 A * 12/1998 Goldhaber ......... G06Q 30/0247
                                                          705/14.1
8,893,297 B2    11/2014   Eversoll
(Continued)

OTHER PUBLICATIONS

Shrestha et al. User-Controlled Privacy-Preserving User Profile Data Sharing Based on Blockchain. Future Technologies Conference, Nov. 2017. (Year: 2017).*

(Continued)

*Primary Examiner* — Waseem Ashraf
*Assistant Examiner* — Christopher C Busch
(74) *Attorney, Agent, or Firm* — Sheppard Mullin Richter & Hampton LLP (57) ABSTRACT

The disclosure relates to securing and enabling user control of profiling data, blockchain-driven matching of users and advertiser-identified anonymous profiling data records of interest, and smart contracts encoded by blockchain for executing transactions. The system may include an anonymized database of profiling data, which is unlinked to any user. The system may implement a private blockchain to store user-defined settings that provide user control over whether and how the profiling data may be used. If a grant to use the data is received, a link is stored that allows the system to identify a user associated with the anonymous profiling data records. If the grant is revoked, the link may be removed. The system may also implement public blockchain technology to record a public information relating to grants, online marketing transactions, making them verifiable, immutable, and transparent for various stakeholders including advertisers, publishers, and users.

22 Claims, 3 Drawing Sheets

(51) Int. Cl.
*G06Q 30/0241* (2023.01)
*H04L 9/06* (2006.01)
*H04L 9/00* (2022.01)

(52) U.S. Cl.
CPC .............. *H04L 9/0637* (2013.01); *H04L 9/50* (2022.05); *H04L 2209/42* (2013.01)

(58) Field of Classification Search
CPC .......... G06Q 30/0239; G06Q 30/0242; G06Q 30/0273; H04L 9/0637; H04L 2209/38; H04L 2209/42
See application file for complete search history.

(56) References Cited

U.S. PATENT DOCUMENTS

| | | | |
|---|---|---|---|
| 11,049,148 | B2 | 6/2021 | Lawbaugh |
| 11,315,150 | B2 | 4/2022 | Blaikie, III |
| 2012/0323794 | A1 | 12/2012 | Livshits |
| 2013/0298247 | A1 | 11/2013 | Laurila |
| 2014/0081844 | A1 | 3/2014 | Hosp |
| 2017/0140408 | A1 | 5/2017 | Wuehler |
| 2017/0195747 | A1 | 7/2017 | Haberman |
| 2018/0053200 | A1 | 2/2018 | Cronin |
| 2019/0019208 | A1 | 1/2019 | Postrel |
| 2019/0173854 | A1 | 6/2019 | Beck |
| 2019/0238525 | A1* | 8/2019 | Padmanabhan ..... H04L 63/0428 |
| 2019/0305938 | A1 | 10/2019 | Sandberg-Maitland |
| 2019/0349343 | A1 | 11/2019 | Gollogly |
| 2019/0361917 | A1 | 11/2019 | Tran |
| 2020/0005284 | A1 | 1/2020 | Vijayan |
| 2020/0074102 | A1 | 3/2020 | Pitti |
| 2020/0082025 | A1 | 3/2020 | Zhou |
| 2020/0089895 | A1 | 3/2020 | Gollogly |
| 2020/0160319 | A1 | 5/2020 | Smith |
| 2020/0202989 | A1 | 6/2020 | Dror |
| 2020/0211409 | A1 | 7/2020 | Latorre |
| 2020/0226285 | A1 | 7/2020 | Bulleit |
| 2020/0250295 | A1 | 8/2020 | Padmanabhan |
| 2020/0302482 | A1 | 9/2020 | Shakespeare |
| 2020/0344233 | A1 | 10/2020 | Lai |
| 2020/0394327 | A1 | 12/2020 | Childress |
| 2021/0141913 | A1 | 5/2021 | Mosconi |
| 2021/0201327 | A1 | 7/2021 | Konig |
| 2021/0271662 | A1 | 9/2021 | Muse |

OTHER PUBLICATIONS

"Build a Better Internet: Let's Start This Journey. Together", Thrive, The Premium Decentralized Ad Marketplace, ico.thrivelabes.io, printed from https://ico.thrivelabs.io/documents/thrive_onepager.pdf, copyright 2017, 2 pages.

"Thrive Whitepaper V11.0", Thrive, The Premium Decentralized Ad Marketplace, ico.thrivelabs.io, printed from https://ico.thrivelabs.io/documents/thrive_whitepaper.pdf, copyright 2017, 43 pages.

"Thrive", Thrive, The Premium Decentralized Ad Marketplace, ico.thrivelabes.io, printed from https://ico.thrivelabs.io/documents/thrive_pitch_deck.pdf, copyright 2017, 12 pages.

Shrestha et al., "Blockchain-Based Research Data Sharing Framework for Incentivizing the Data Owners", International Conference on Blockchain, University of Saskatchewan, Jun. 22, 2018 (Year: 2018), pp. 259-266.

Shrestha et al., "User-Controlled Privacy-Preserving User Profile Data Sharing Based on Blockchain", Future Technologies Conference (FTC), Nov. 2017 (Year: 2017), 10 pages.

* cited by examiner

USER CONTROL OF ANONYMIZED PROFILING DATA USING PUBLIC AND PRIVATE BLOCKCHAINS IN AN ELECTRONIC AD MARKETPLACE

CROSS-REFERENCE TO RELATED APPLICATIONS

This application is a divisional of U.S. patent application Ser. No. 15/995,158, filed Jun. 1, 2018, entitled "USER CONTROL OF ANONYMIZED PROFILING DATA USING PUBLIC AND PRIVATE BLOCKCHAINS IN AN ELECTRONIC AD MARKETPLACE", which is hereby incorporated herein by reference in its entirety.

FIELD OF THE INVENTION

The field of the invention relates to securing and enabling user control of profiling data, use of a private blockchain to facilitate matching of users and anonymous profiling data records of interest, and use of a public blockchain to transparently and immutably publish system activity.

BACKGROUND OF THE INVENTION

Electronic data mining based on online network activity has compromised the security and privacy of user data. The openness of the Internet has fueled its popularity, but various models around delivering online content has led to many closed, proprietary, solutions that exacerbate the problem of online data security and privacy. For example, much of today's online content is supported through paywalls such as a requirement to pay for a subscription to access content, advertising revenue, or a combination of the two. To support advertising revenue, conventional electronic advertising exchanges have been developed. Because of the scale and complexity of data available over wide area networks such as the Internet, identifying relevant users that may have an interest in a specific subject matter of interest has become increasingly difficult yet important for system efficiency. Conventionally, electronic ad exchanges focus on intensively mining user data in order to provide increasing focus on relevant users at the expense of user privacy. Users are growing increasingly wary of the use of their online data and the need to protect it. However, conventional systems do little to protect online data privacy. Furthermore, the lack of transparency caused by the electronic nature of these exchanges makes it difficult for advertisers, publishers, and users alike to trust these systems. These and other problems exist with online electronic ad exchanges.

SUMMARY

The disclosure addressing these and other problems relates to securing and enabling user control of profiling data, blockchain-driven matching of users and advertiser-identified anonymous profiling data records of interest, and smart contracts encoded by blockchain for executing transactions. The system may include an anonymized database of profiling data, which is unlinked to any user. The system may implement a private blockchain to store user-defined settings that provide user control over whether and how the profiling data may be used. If a grant to use the data is received, a link may be stored that allows the system to identify a user associated with the anonymous profiling data records. If the grant is revoked, the link may be removed. The system may also implement public blockchain technology to record an public information relating to grants, online marketing transactions, making them verifiable, immutable, and transparent for various stakeholders including advertisers, publishers, and users.

To facilitate the foregoing and other functions, the system may build and maintain an anonymized database that stores anonymous profiling data (including different types of profiling data such as behavioral data, demographic data, etc.), user-facing applications that enable users to control access to their profiling data, an advertiser-facing audience builder application, and a secured private platform that secures personal identifiable information through a private blockchain.

Users may enroll to receive advertisements and corresponding rewards. An enrolled user may be assigned with a user identifier and a device identifier for each device used by the user. The user identifier may be used internally by the system to identify the user. The user's personal identifying information, demographic information, and/or other private information may be stored in association with the user identifier. While generally kept in secure storage without access to others, this private information may further be encrypted and secured prior to storage. The profiling data may be linked with the user identifier only when permitted by the user.

The device identifier may be transmitted to and stored at a user device. In some instances, the device identifier may be stored locally at the device, such as via a browser cookie. If a user grants access to use profiling data or other data (e.g., personal identifying information or demographic data), the system may store a link between the user identifier and the device identifier(s). Revocation of this grant will result in removal of the link. Removal of the link will remove an ability to associate a user with anonymous profiling, as will be described below.

Grants may permit use of data derived from some or all of the user devices, particular types of profiling data, particular types of advertisements and other types of grants. The system may receive and store user-defined grants to the private blockchain in association with the user identifier. In particular, the user-defined access grants may be stored in the private blockchain in association with a user's wallet address.

When the user device generates activity that results in profiling data (such as by browsing an Internet site, conducting online shopping, etc.), a participating platform such as a website of a publisher and/or the user device may provide the profiling data and the device identifier to the system. The system may generate an anonymous profiling data record containing a unique record identifier and the profiling data. The unique record identifier may be generated to uniquely identify the anonymous profiling data record, which may be stored in an anonymized database. By themselves, anonymous profiling data records in the anonymized database cannot be used to identify a user.

The system may determine whether the device identifier is linked with a user identifier, indicating that the user has permitted use of the user's profiling data. The system may also determine whether the user has permitted use of the type of profiling data contained in the anonymous profiling data record. This determination may include determining whether use of the type of incoming profiling data is permitted (for example, if the type of profiling is web browsing, whether the user has granted access to web browser data), whether the grant has expired, and/or whether other user-defined settings permit such use. The system may link the anonymous profiling data record to a user identifier if the user has permitted such use. In this manner, a given anonymous profiling data record in the anonymized database 14 may be linked to a user only when a user has granted permission to use either all or specified profiling data.

The system may write the unique record identifier from the anonymous profiling data record, the user identifier, and a grant transaction identifier to the private blockchain. In this manner, the block may be later consulted to identify whether the anonymous profiling data record may be used to target the user. If the permission is revoked by the user, the link may be deleted, thereby erasing the linkage between the user identifier and the device identifier. In some instances, a grant may be revoked by writing a new entry in the private blockchain, and the existence of this revocation will cause any links to anonymized profiling data records to be ignored.

In some instances, the system may write the grant transaction identifier, a date of the grant of access to the anonymous profiling data record, type of personal identifiable information permitted to be used (if applicable), a duration of the grant, and/or other information to the public blockchain for public access and transparency relating to the grant.

Specifying an Audience through an Audience Definition

The system may provide interfaces and tools to build and transmit an advertiser request for processing at the secured private platform. The interfaces and tools may include options for filtering anonymous data of interest so that advertisers may identify and specify data of interest based on the anonymous profiling information even if the advertisers do not know the identity of the users associated with the data. In a particular example, an advertiser may target users who are aged 18-30 and browse sporting goods items. The system may identify anonymous profiling data records that correspond to these specifications. Other types of profiling data may be targeted as well. Once an audience has been specified, the system may build a list of anonymous identifiers (such as unique record identifiers) that are associated with the specified profiling data.

The request may include an advertiser identifier, advertisement campaign parameters (such as pricing model/information—bid amount, cost per click, cost per impression, etc., a maximum budget, a starting and/or ending date of the campaign), the list of anonymous identifiers, a type of channel to deliver the advertisement (such as via email, social media platform, mobile notification, etc.), advertising content, and/or other information that describes an advertisement to be distributed. In some instances, the request may be persistent unless it expires or is canceled by the advertiser. While the audience order is unexpired and not canceled, the system may periodically update relevant users who have profiling data that match the specifications in the request and who have permitted use of their profiling data.

In some instances, the system may encode the request as a digital object for input to specific handlers of the system. In these instances, the object may include an expected action to take such as send an email with an advertisement, provide an advertisement via social media, calculate data or rewards, return a query result, etc. An appropriate handler may be identified and may validate the request. In some implementations, each handler may be pre-compiled into the system, thereby ensuring the integrity of input handling and processing.

Audience Assembly and Ad Delivery

Each handler may identify appropriate users, with specific functionality for each handler to facilitate actual delivery of an advertisement; it may also be used in a similar fashion for analytics and behavioral data measurement of audiences.

For example, some handlers may deliver ads (as used herein, "ads" will be used interchangeably with "advertisements") to specific channels like emails or social media accounts, while other handlers may add ads to an advertisement queue. Similarly, a handler may be designed to create a table of aggregate analytics reports like showing the distribution of people in the audience of users across demographics (such as gender, users that spend X dollars per year/month on electronics, etc.). The following functionality is common amongst the handlers. A handler may consult the private blockchain and the linking database to determine whether any of the anonymous identifiers specified by the request is linked to a user that has authorized use of their profiling data. For these users, the system may store a link between the user identifier and the anonymous identifier (e.g., a device identifier). In some instances, the handler may also determine whether the user has granted permission to deliver the specific type of ad to the user. If the user has granted access to the user's data and specific permissions for the ad type requested has been granted, the handler may add that user to a list of recipients that should receive the advertisement. The specific manner of delivery may vary depending on the specific handler used to process the request.

Delivery Via Specific Channels

Some requests may require use of personal identifying information such as a specific communication channel. For example, an advertiser may specify in the request that an advertisement be sent to relevant users' social media accounts, email addresses, and so forth (none which the advertiser does not have access to). If so, an appropriate handler may add that user to be a recipient of the specified advertisement through the specified channel. The handler may cause the advertisement to be transmitted through the specified channel to the targeted recipient. Thus, while the advertiser identified an anonymous user that should receive an advertisement, the advertiser does not know who that anonymous user is. The system will be able to link the anonymous user with personal identifiable information if the user has granted permission to do so.

Targeted Delivery Via the Advertising Queue

Some requests may not require use of personal identifying information, but still target certain users having certain profiling data. For example, the request may not specify that a user's communication channel be used to communicate the ad, but may specify a set of anonymous identifiers the advertiser wishes to target. In this example, a handler may add the advertisement to a queue of advertisements to be delivered to users who have permitted use of their profiling data (including any permitted types of ads). For example, the queue may store advertisement identifiers that are associated with device identifiers so that devices interacting with an affiliate website or other touch point may be provided with the relevant ads in the ad queue.

Ads in the queue may be provided to users through a publisher's platform such as a website that provides the users' device identifiers stored locally as a cookie. In these instances, if a user who has permitted use of his profiling data browses the website and the website providers a device identifier, the system may provide the website with an ad from the ad queue for presentation in the website.

Ads in the queue may be provided to users based on logged in or subscriber status with the ad service itself. For example, a browser extension or advertising iframe or html code can request whether or not the user is logged in or has signed up for the ad service and, in this scenario, may not need to use cookies to identify the applicable ad queues for a user.

Any clicks or interactions of the ad may be tracked for payment purposes. For instance, the advertiser may be charged per click according to the ad budget in a request, the website may be provided with a fee for serving the ad, and the user may be provided with a reward for agreeing to permit use of his profiling data.

Untargeted Delivery Via the Advertising Queue

Some requests may not require use of personal identifying information and not target certain users. In this case, processing may continue as with the targeted delivery via an advertising queue, but without ads being previously associated with a system-generated user identifier. For example, the agent on a website may detect a system-generated user identifier and transmit the identifier to the secure private platform. This indicates to the secure private platform that a user is browsing an affiliate website. The secure private platform may select an ad from a general ad queue (one that is not targeted to users having particular profiling data), check any user-defined settings that permit delivery of the ad, and transmit the ad to the website if delivery is permitted to that user. Whichever handler is used to process a request, the system may deliver advertisements to users who have permitted used of their profiling data while not providing an personal identifying information of the user to the advertiser.

Aggregated Analytics Reports from Secured Audience Data

An object type may also define an audience of users with a destination of a report or analysis being created. Audience assembly service is used in those cases that require access to private data or data secured on the private blockchain. A handler is created with the analytics data type. This allows the audience assembly to perform counts and measurement of the audience members as it assembles the matching users. This kind of data analysis occurs directly on anonymous data stores as well but some scenarios require identity and/or private blockchain transactions to be scored and tallied. For example, if the desire is to create a report that shows the age distribution of users that received a reward from a particular advertiser the advertiser may ask via the audience assembly "What are the age ranges of people that saw my ads last week". The reply from the handler, instead of being a new ad being delivered like in the other scenarios, creates a report that groups the age ranges of those people that received an ad in that time period.

Electronic Ad Marketplace

The system may provide an electronic ad marketplace that includes electronic interfaces and tools for advertisers and publishers to transparently participate in an electronic advertising marketplace. For example, electronic ad marketplace may receive advertisement information from advertisers. The advertisement information may include the advertisement content in any format (e.g., video, audio, text, graphics, etc.), an electronic address such as a Uniform Resource Locator (URL) to the advertisement content, metadata relating to the advertisement (e.g., size, type, format, etc.), advertisement campaign parameters, and/or other information relating to the advertisement that the advertiser would like to be provided to users via the secure private platform. The electronic ad marketplace may publish the advertisement information, such as by writing the advertisement information to the public blockchain.

The electronic ad marketplace may receive publisher information from publishers. The publisher information may include an electronic address of the publisher (such as a URL of the publisher's website), a location of the space allocation on the website for advertisements, size allocated for the advertisement (such as absolute dimensions, relative dimensions, etc.), publishing parameters such as a minimum asking price for publishing an ad, subject matter for a given site, and/or other information relating to the publisher. The electronic ad marketplace 40 may publish the publisher information, such as by writing the publisher information to the public blockchain.

Some or all of the advertisement information and/or publisher information may be written to the public blockchain, thereby creating an immutable record of the information. In this way, advertisement information and publisher information may not be tampered with.

In an implementation, electronic ad marketplace may generate one or more smart contracts based on the advertisement information, the publisher information, reward information, and/or other information that may be used to self-execute an agreement between parties. For example, a smart contract may encode one or more rules that execute terms of a contract if the campaign parameters have been satisfied, the publisher's parameters have been satisfied, the advertisement has been transmitted to a user, which may occur via a publisher. The terms of the contract may include the bid amount an advertiser is willing to pay, an amount to be paid to a publisher, an amount to be rewarded to a user for permitting use of his profiling data, and/or other terms.

Additional checks can, at any time after the blockchain record is created, verify whether the assets being referred to in the advertisement have changed from the original blockchain record. If assets have changed, the Ad Marketplace will automatically de-list the advertisement from any active ad contracts. It may further be used to flag the advertiser in the marketplace. For example, an advertiser originally shows a legitimate ad image that they later attempt to replace with adult content in which case the ad itself becomes de-listed and removed from all contracts and the advertiser is flagged as potentially being compromised.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The disclosure relates to securing and enabling user control of profiling data, blockchain-driven matching of users and advertiser-identified anonymous profiling data records of interest, and smart contracts encoded by blockchain for executing transactions. The system may include an anonymized database of profiling data, which is unlinked to any user. The system may implement a private blockchain to store user-defined settings that provide user control over whether and how the profiling data may be used. If a grant to use the data is received, a link is stored that allows the system to identify a user associated with the anonymous profiling data records. If the grant is revoked, the link may be removed. The system may also implement public blockchain technology to record an public information relating to grants, online marketing transactions, making them verifiable, immutable, and transparent for various stakeholders including advertisers, publishers, and users.

Various examples used herein will describe advertisements for illustration and not limitation. Other types of marketing information may be provided to users as well. Furthermore, unless otherwise noted, the term "user" will be used to denote an end user who is provided with an advertisement.

Figure 1:
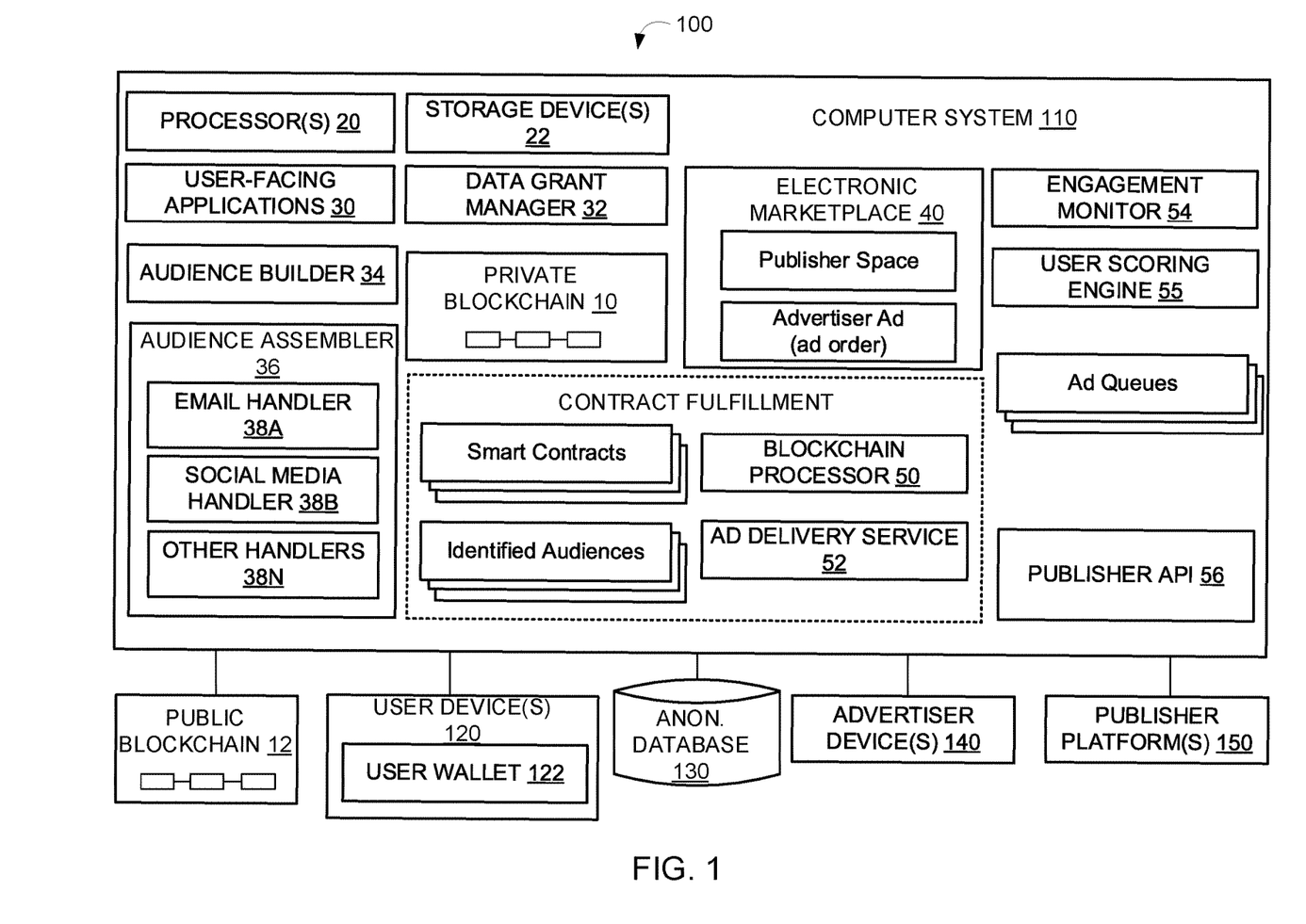
FIG. 1 illustrates an example of a system of securing and enabling user control of profiling data, use of a private blockchain to facilitate matching of users and anonymous profiling data records of interest, and use of a public blockchain to transparently and immutably publish system activity, according to an implementation of the invention.

FIG. 1 illustrates an example of a system 100 of securing and enabling user control of profiling data, use of a private blockchain to facilitate matching of users and anonymous profiling data records of interest, and use of a public blockchain to transparently and immutably publish system activity, according to an implementation of the invention. System 100 may include a computer system 110, a private blockchain 10, a public blockchain 12, one or more user devices 120, an anonymized database 14 (illustrated as "anon. database 14), one or more advertisers 140, one or more publishers 150, and/or other components. The computer system 110 may provide a secured private platform through which advertisers 140 may provide targeted advertisements to users (such as via their user devices 120) who permit use of their profiling data. In some instances, the advertisements may be delivered to users via publisher platforms 150.

The private blockchain 10 may store user-defined privacy settings, a record of advertisement delivery by the computer system 110, a link to one or more records in the public blockchain 10, and/or other data that is not publicly made available. The user defined privacy settings may specify whether and what types of profiling data may be used by the computer system 110, types of ads that are permitted, an expiration of such permission, and/or other settings that define control over the use of the profiling data. In this manner, the user may have "ownership" over the user's profiling data. The record of advertisement delivery may include information that specifies when an advertisement was delivered, an identification of the advertisement, a channel in which it was delivered (such as via email or general ad), and/or other information that can be used to verify that the advertisement was actually delivered.

The private blockchain 10 may include one or more nodes that are connected to one another using one or more connection protocols, including a peer-to-peer connection protocol. The particular number of, configuration of, and connections between the nodes may vary. The private blockchain 10 may include a private distributed ledger that each node may store. The computer system 110 may restrict access to the private blockchain 10, securing its privacy. For example, in implementations in which a user wallet 122 configures user device 120 as a node in the private blockchain 10, the user wallet 122 may access only data pertaining to the user device 120 via public-private key encryption. In this example, data on the private distributed ledger or a blockchain transaction relevant to a given user wallet 122 may be encrypted by the computer system 110 using the user wallet' public key such that only the user wallet's private key can decrypt its contents.

The public blockchain 12 may store a user's reward balance, information relating to when a user granted access to the user's profiling data, information relating to when an audience order was made, an advertisement submitted by an advertiser 140 for provision to users, a listing of offered space (such as within a website) of a publisher 150 in which the advertisement can be placed, reward payment information, and/or other information that is made available to the public for transparency.

The public blockchain 12 may include one or more nodes that are connected to one another using one or more connection protocols, including a peer-to-peer connection protocol. The particular number of, configuration of, and connections between the nodes may vary. The public blockchain 12 may include a public distributed ledger that each node may store. Unlike the private distributed ledger of the private blockchain 10, the public distributed ledger of the public blockchain 12 may be read and written to by any node that is registered with the public blockchain.

Each of the private and public blockchains (10, 12) may be implemented in various ways, except that the private blockchain 10 may enforce credentialed access to a distributed ledger, as described above. In each blockchain, a corresponding distributed ledger may include a series of blocks of data that reference at least another block, such as a previous block. In this manner, the blocks of data may be chained together. An example of a distributed ledger is described in the well-known white paper "Bitcoin: A Peer-to-Peer Electronic Cash System," by Satoshi Nakamoto (bitcoin.org), the contents of which are incorporated by reference in its entirety herein. Other blockchain platform technologies may be used as well, such as the Ethereum platform, described in the white paper, "Ethereum Specification" (https://github.com/ethereum/wiki/wiki/White-Paper), the contents of which are incorporated by reference in its entirety herein.

The anonymized database 14 may store profiling data, which may be considered private data of a user. For example, the profiling data may include behavioral, demographic, location, and/or other data relating to the user. The behavioral data may include shopping data, Internet browsing data, and/or other online activity information of a user. The location information may include a current location of a user, historic location of a user, and/or other information that indicates a place, address, or other geolocation of a user. The profiling data may be anonymized by storing only an anonymous identifier in association with the profiling data.

The linking database 16 may store a link between a user identifier assigned to the user and a device identifier if the user has granted permission to use the user's profiling data. The user identifier may be stored in association with personally identifiable information of the user. The link may be deleted if the user revokes the permission. In this case, any linkage between the user identifier and the device identifier will be lost and the profiling data will not be identifiably linked to the user.

User Control of Profiling Data

The user-facing applications 30 may provide interfaces that allow a user to provide user-defined settings that control whether and to what extent the user's personal identifiable information and profiling data may be used. The user-defined settings may include advertising preferences, a setting that controls whether the personal identifiable information and profiling data of the user may be used for advertising, and/or other settings controlled by a user. As used herein, a permission from a user that permits the system to use certain data such as ad preferences, personal identifiable information and profiling data will also be referred to as a "grant."

The ad preferences may specify characteristics of ads that are permitted by the user. These ad characteristics may include a format (such as video, audio, text, etc.), duration (such as runtime length), and/or other ad parameter that can be used to filter ads for presentation to the user. As described herein, because users may be rewarded for receiving and/or interacting with ads, less preferences will lead to less filtered ads and therefore the potential for greater rewards. On the other hand, more preferences (and more privacy) may result in a potential for lesser rewards. This balance may be controlled by the user according to user preferences.

Through the user-defined setting relating to personal identifiable information, the user may control whether marketing information may be sent to the user through the user's email address, social media account, or other communication channel. The personal identifiable information may include, for example, an email address, a social media account, a name, and/or other information that may be used to personally identify a user. The user may also control whether and which types of profiling data may be used for targeting.

Figure 2:
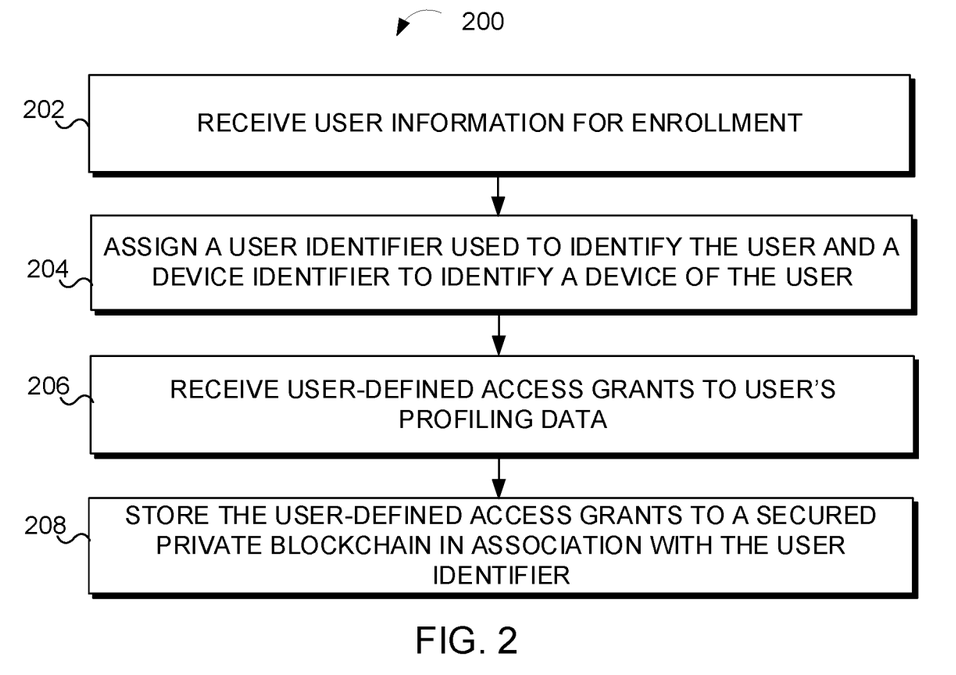
FIG. 2 illustrates an example of a process of registering a user and generating anonymous identifiers for the user, according to an implementation of the invention.
Figure 3:
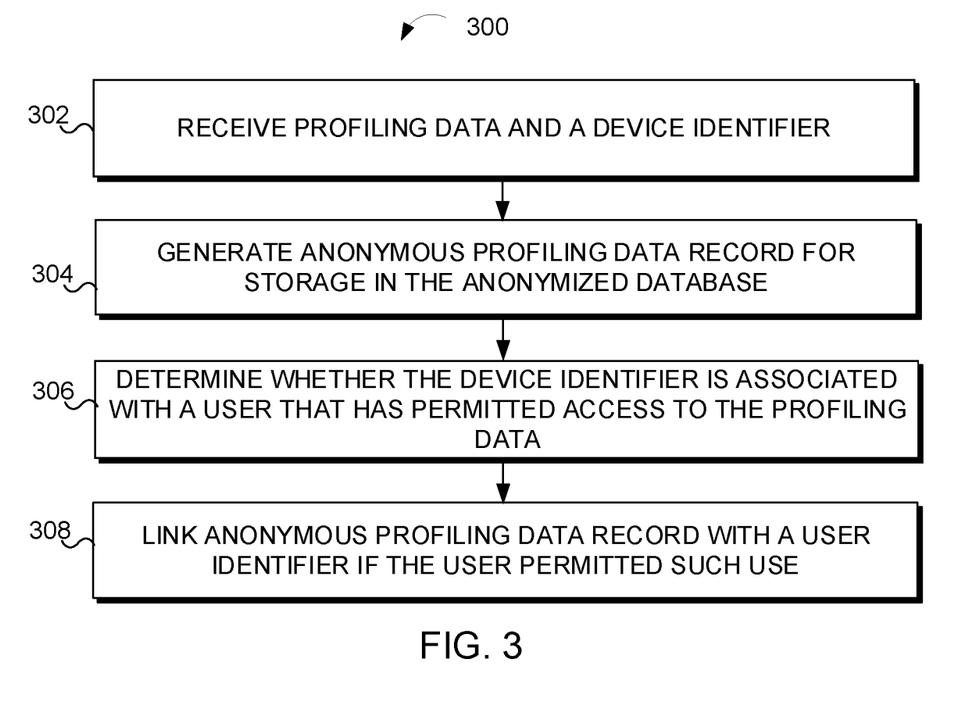
FIG. 3 illustrates an example of a process of obtaining user-defined settings for permitting access to the user's profiling data, according to an implementation of the invention.

An example of a process of registering a user and generating anonymous identifiers for the user will now be described with reference to FIG. 3. In an operation 202, process 200 process 200 may receiving user information. The user information may include personal identifying information, demographic information, and/or other information relating to the user.

In an operation 204, the user may be assigned with a user identifier that the secure private platform uses to identify the user. This user identifier may be used internally by the secure private platform to identify the user and any permissions granted by the user to use the user's profiling data. The user's personal identifying information, demographic information, and/or other private information may be stored in association with the user identifier. The user may also be assigned with a wallet address for a private wallet 122, which may be associated with the user identifier in the system, so that information on the private blockchain 10 relating to the user may be obtained using the wallet address.

In an operation 204, process 200 may assign a user identifier for the user and a device identifier for a device (such as user device 120) of the user. The device identifier may be transmitted to and stored at the user device 120 used by the user to enroll. In some instances, the device identifier may be stored locally at the device, such as via a browser cookie. When the user device 120 accesses a participating platform such as a website of publisher 150, the user device 120 may provide the device identifier, such as via the browser cookie. The system may then determine whether the device identifier is associated with a user identifier and handle any profiling data according to whether the user has permitted use of this data. If the user uses a new user device to access the website, then the website may request that the user provide the user's user identifier so that the new user device may be assigned with a new device identifier, which may also be linked with the user identifier. In this manner, for each device, a device identifier may be assigned to identify the device. As such, activity on the device (including shopping activity, online browsing activity, geolocation activity, etc.) may be monitored and stored as profiling data, as will be described below. The device identifier by itself cannot be used to identify a user. The device identifier(s) and the user identifier are not stored in association with one another unless the user has granted permission to use the user's profiling data. In this manner, if the user has not granted such permission, the profiling data associated with the device identifier cannot be linked with a specific user. In some instances, the system may associate specific permissions with specific devices. For example, the user may specify that profiling data derived from one device of the user may be used, while profiling data derived from another one of the user's devices may not be used.

In an operation 208, process 200 may include storing the user-defined access grants to the private blockchain 10 in association with the user identifier. In particular, the user-defined access grants may be stored in the private blockchain 10 in association with the user's wallet address. For example, the data grant manager 32 may store the grants in the private blockchain 10 in association with the user identifier (or more particularly, in association with the user's wallet address for the private blockchain). For instance, based on input through the user-facing applications 20, the data grant manager 32 may write a specified grant to a blockchain transaction, which may be included in a block of a distributed ledger of the private blockchain 10. The distributed ledger may encrypt any personal identifiable information using public key and private keys. Thus, the distributed ledger may securely store identifying information about the user and the user's settings with respect to what types of user data may be used about the user, but not the profiling data itself. In this manner, third parties will not have access to any of the profiling data or personally identifiable information unless the user permits such access via a user setting. As such, none of the profiling data or personal identifiable information is exposed to the public unless permitted by the user, while maintaining an immutable record of the user's settings that permit (or deny) the use of the user's personal identifiable information and behavioral data. The user may later view and modify the user's settings such as using the private wallet 122, and any changes may be recorded to the private blockchain 10.

Generating Anonymized Profiling Data

Generating anonymized profiling data will now be described with reference to FIG. 3. In an operation 302, process 300 may include receiving profiling data and an anonymous identifier such as a device identifier. A brief overview of how the profiling data is generated will be described. In operation, a user registered to use the system may conduct activity on a user device 120 that includes one or more agents 126. The one or more agents 126 may include programs that monitor activity on the user device 120 and report this activity to the computer system 110. For example, an agent 126 may include a browser extension, a mobile application, a platform-specific application (such as an electronic shopping application), and/or other types of user application that can report user activity that may be used as profiling data. As one example, the browser extension may be configured as a script that transmits browser history information and a device identifier to the computer system 110, which stores the browser history information anonymously linked to the device identifier in the anonymous database 14. Other agents 126 may monitor and provide other types of profiling data.

In some instances, the one or more agents 126 may store the device identifier of an enrolled device. For instance, an agent 126 may store the device identifier as a browser cookie as previously described with reference to FIG. 3. If a device identifier is not stored, the agent 126 may determine whether the device is enrolled to use the system. If so, then the device identifier may be obtained from the secure private platform and stored as a cookie. If the agent 126 determines that the device is not enrolled to use the system, the agent 126 may request that the user enroll the device, as described above. The agent 126 may transmit the profiling data along with the device identifier, which is received at operation 402.

In an operation 304, process 300 may include generating an anonymous profiling data record containing a unique record identifier and the profiling data. The unique record identifier may be generated to uniquely identify the anonymous database record. The anonymous database record may be stored in anonymized database 14. As such, by themselves, anonymous profiling data records in the anonymized database 14 cannot be linked to any user.

In an operation 306, process 300 may include determining whether the device identifier is associated with a user that has permitted use of the type of profiling data contained in the anonymous profiling data record.

Linking Anonymized Data Records to Users Based on User Grants

In an operation 308, process 300 may include linking the anonymous profiling data record to a user identifier if the user has permitted such use. As previously noted, if a user has granted permission to use the user's profiling data, a link between a user identifier and the user's device identifier may be stored. In some instances, the link may be stored in a smart contract that also stores or otherwise consults the user-defined grants. When the profiling data and device identifier are received from the agent 126, the data grant manager 32 may identify a user associated with the device identifier and grants from the user (or a smart contract that is associated with the device identifier). The data grant manager 32 may determine whether the user has previously permitted use of the profiling data. This determination may include determining whether use of the type of incoming profiling data is permitted (for example, if the type of profiling is web browsing, whether the user has granted access to web browser data), whether the grant has expired, and/or whether other user-defined settings permit such use.

In some implementations, the system may include write the unique record identifier from the anonymous profiling data record, the user identifier, and a grant transaction identifier to the private blockchain 10. For example, if the user has permitted use of the profiling data, the data grant manager 32 may generate a private blockchain transaction that contains the unique record identifier, the user identifier, and a grant transaction identifier that uniquely identifies this transaction. This private blockchain transaction may be written to a distributed ledger of the private blockchain 10 and later consulted to identify the user in the event that the anonymous profiling data record associated with the unique record identifier is matched with an audience definition from an advertiser 140, as will be discussed below. In this manner, a given profiling data record in the anonymized database 14 may be linked to a user only when a user has granted permission to use either all or specified profiling data. If the permission is revoked by the user, the link may be deleted, thereby erasing the linkage between the user identifier and the device identifier. Thus, any anonymous profiling data record cannot be linked to a user. In some instances, this functionality may be encoded as a smart contract so that creation or deletion of a link is automatic upon user input and is transparent so that users and others can verify this functionality.

In some instances, the data grant manager 32 may generate a public blockchain transaction that contains the grant transaction identifier, a date of the grant of access to the anonymous profiling data record, type of personal identifiable information permitted to be used (if applicable), a duration of the grant, and/or other information for public access and transparency. The data grant manager 32 may write the public blockchain transaction as to the public blockchain 12.

In some instances, the user's public and/or private wallets may provide access for the user to view or modify the user-defined settings. For example, the data grant manager 32 may receive a request to revoke a grant. Such revocations may affect future and previous grants to use profiling data. The revocation request may be to revoke a general grant (such as a previous grant to email the user). In this case, the grant will be removed. If written to the private blockchain 10, for example, a new block may be written that revokes any previous grant. Alternatively, the block containing the original grant may be burned in a private blockchain. If the revocation request relates to a specific grant transaction identifier, then the particular grant for that grant transaction identifier may be revoked in a similar manner by revoking the block in the private blockchain 10 pertaining to the grant transaction identifier. Doing so will "orphan" the corresponding anonymous profiling data record since it will no longer be linkable to a user. In some instances, revocations will be enacted upon expiration of a grace period after a revocation request has been made. In this manner, a user may rollback or cancel a revocation request before this grace period expires. In some implementations, if a user deletes an agent operating on the user device 120, data relating to that device may be orphaned. If the agent is re-installed on the user device 120 and the user signs in with the system-generated user identifier, the profiling data may be re-linked with the user if the device identifier has been retained on the user device. However, if the device identifier has also been removed from the device, and a new device identifier is assigned to the user device 120, the previous profiling data associated with the device may be permanently orphaned.

Specifying an Audience through an Audience Definition

The audience builder application 34 may build and transmit an advertiser request for processing at the secured private platform. The advertiser request may include an audience order, an analytics and metrics request, and/or other request to the secured private platform.

Entities such as advertisers 140 may use the audience builder application 34 to create and submit an audience order. For instance, the audience builder application 34 may provide interfaces and tools for browsing the anonymized database 14 and building an audience specification. The interfaces and tools may include options for filtering anonymous users of interest so that advertisers 140 may identify and specify users of interest based on the anonymous profiling information even if the advertisers do not know the identity of such users. In a particular example, an advertiser 140 may input an audience specification that targets users who are aged 18-30 and browse sporting goods items. Other types of profiling data may be used to specify audiences as well. Once an audience has been specified, the audience builder application 34 may build a list of anonymous identifiers (such as unique record identifiers) that are associated with the specified profiling data.

The audience order may include an advertisement specification that specifies an advertisement that the advertiser would like to distribute via the secured private platform. The advertisement specification may include an advertiser identifier, advertisement campaign parameters (such as pricing model/information—bid amount, cost per click, cost per impression, etc., a maximum budget, a starting and/or ending date of the campaign), the list of anonymous identifiers in which the advertiser may be interested based on corresponding behavioral data—in these instances, the advertiser may target anonymous users associated with certain anonymized profiling data even though they cannot specifically identify these users, a type of channel to deliver the advertisement (such as via email, social media platform, mobile notification, etc.), advertising content, and/or other information that describes an advertisement to be distributed. The pricing model may dictate any amounts due to a publisher 150 (if applicable) and rewards that may be due to a user. For instance, in a cost-per-click model, the user may be rewarded if the user clicks on or otherwise interacts with an advertisement, resulting in a fee debit from the advertiser. In a cost per impression model, the reward may be provided to the user if the ad is displayed or otherwise provided to the user, whether or not the user clicks on or otherwise interacts with the ad. It should be noted that the reward model may be independent of the pricing model as well, and driven by a smart contract having terms agreed to by the user and the secure private platform.

In some instances, the audience order may be persistent unless it expires or is canceled by the advertiser. While the audience order is unexpired and not canceled, the system may periodically update relevant users who have profiling data that match the specifications in the order and who have permitted use of their profiling data.

The analytics and metrics request may be a request to provide analytics or metrics relating to a specific advertiser request, campaign of advertisements, all advertiser requests for an advertiser identifier, and/or other grouping of advertisements. For example, an object type may also define an audience of users with a destination of a report or analysis being created. Audience assembly service is used in those cases that require access to private data or data secured on the private blockchain. A handler is created with the analytics data type. This allows the audience assembly to perform counts and measurement of the audience members as it assembles the matching users. This kind of data analysis occurs directly on anonymous data stores as well but some scenarios require identity and/or private blockchain transactions to be scored and tallied. For example, if the desire is to create a report that shows the age distribution of users that received a reward from a particular advertiser the advertiser may ask via the audience assembly "What are the age ranges of people that saw my ads last week". The reply from the handler, instead of being a new ad being delivered like in the other scenarios, creates a report that groups the age ranges of those people that received an ad in that time period. Other types of requests may be made as well, including queries into the secured private platform.

In some instances, the audience builder application 34 may encode the request as a digital object for input to specific handlers of the secured private platform. In these instances, the object may include an expected action to take such as send an email, provide an advertisement via social media, calculate data or rewards, return a query result, etc. In these instances, the appropriate handler may validate the action as an expected action.

Audience Assembly and Ad Delivery

The audience assembler 36 may take the request as input from the audience builder application 34 and process the request to deliver advertisements specified by the request, return a response to a query in the request, and/or otherwise perform an action specified by the request. In some instances, the audience assembler 36 may validate the object to ensure it is a valid object and recognize an object type to route the object to an appropriate handler 38. In this manner, inputs such as requests or queries may be well-defined to strictly control inputs to the system, and therefore strictly controlling corresponding outputs. The audience assembler 36 may validate the object in various ways. For instance, the object may encode a blockchain transaction identifier having a payload that includes the request. The audience assembler 36 may recognize an advertiser that created the blockchain transaction. Other validation techniques may be used as would be apparent based on the disclosure herein. For the examples that follow, delivering an advertisement will be used for illustrative purposes. It should be noted, however, that some handlers facilitate resolving queries or generating metrics and analytics reports.

Once it validates the request, the audience assembler 36 may identify a particular handler to handle the request. For example, the audience assembler 36 may recognize various properties of the object. The properties may include a specification of a type of communication channel through which an advertisement should be transmitted. In particular, the audience assembler 36 may determine that the object encodes a request to send advertisements via a social media account. In this example, the audience assembler 36 may identify the social media handler 38B for the social media platform that hosts the social media account. In another example, the object recognition module may determine that the object encodes a request to send advertisements via email. In this example, the may audience assembler 36 identify an email handler 38B.

Whichever handler is selected, each handler 38 may identify appropriate users in a similar manner, with specific functionality for each handler 38 to facilitate actual delivery of an advertisement. For example, each handler 38 may consult the private blockchain 10 and the linking database 16 to determine whether any of the anonymous identifiers specified by the request is linked to a user that has authorized use of their profiling data. For these users, the linking database 16 will include a link between the system-generated user identifier and the anonymous identifier. In some instances, each handler 38 may also determine whether the specific ad being requested has been permitted to be delivered. For example, the private blockchain 10 may store indications of specific permissions granted by the user such as ad source, ad type, etc. If the user has granted access to the user's data and specific permissions for the ad type requested has been granted, each handler 38 may add that user to a list of recipients that should receive the advertisement. The specific manner of delivery may vary depending on the specific handler 38 used to process the request. Furthermore, each handler 38 may provide output that does not specifically identify the users in the audience that was matched. In this manner, in some instances, an advertiser that made an ad order may not be provided with identities of users in the audience—only that the ad was delivered to such users.

Delivery via Specific Channels

Some requests may require use of personal identifying information such as a specific communication channel. For example, an advertiser 140 may specify in the request that an advertisement be sent to relevant users' social media accounts, email addresses, and so forth (none which the advertiser does not have access to). If so, an appropriate handler 38 may add that user to be a recipient of the specified advertisement through the specified channel. For example, for a request to deliver an ad through a social media channel, the social media handler 38B may add the user to a set of users to which an advertisement will be directed through their social media account. In some implementations, the social media handler 38B may verify that the requesting advertiser has proper social media credentials to send ads through the social media platform. In some instances, the social media handler 38B may batch the social media account identifiers (which may be email addresses) that should receive the advertisement and send the batched social media account identifiers to an appropriate social media platform to deliver the ads. In some instances, the social media handler 38B may generate a hash of each social media account identifier and send the hashes to the social media platform, which matches each hash to an appropriate social media account to which to provide the ad. Similarly, the email handler 38A may add the user to a set of users to which an advertisement will be sent to their email addresses. Any user who has not supplied such permission will not be linked to any of the anonymous identifiers specified in the request and therefore will not be targeted, ensuring their privacy and preventing use of their profiling data.

The handler 38 may cause the advertisement to be transmitted through the specified channel to the targeted recipient. Thus, while the advertiser identified an anonymous user that should receive an advertisement, the advertiser does not know who that anonymous user is. The system will be able to link the anonymous user with personal identifiable information if the user has granted permission to do so.

Targeted Delivery Via the Advertising Queue

Some requests may not require use of personal identifying information, but still target certain users having certain profiling data. For example, the request may not specify that a user's communication channel be used to communicate the ad, but may specify a set of anonymous identifiers the advertiser wishes to target. In this example, other handlers 38N may add the advertisement to a queue of advertisements to be delivered to users who have permitted use of their profiling data (including any permitted types of ads). For example, the queue may store advertisement identifiers that are associated with device identifiers. For example, once a handler 38 has identified a user that should receive an advertisement via a channel other than the Ads in the queue may be provided to users through a delivery platform 150 such as a website that will include the ads. In these instances, if a user who has permitted use of his profiling data browses the website that is affiliated with the secure private platform, the secure private platform may provide the website with an ad from the ad queue for presentation in the website. To do so, the website may implement an agent, such as a Javascript program, that communicates with the secure private platform. The agent may obtain the system-generated user identifier of a user who has permitted the system to use his profiling data. The system-generated user identifier may be stored locally on the user device 120 such as through a browser cookie. The agent may transmit the system-generated user identifier to the secure private platform, which may recognize that the system-generated user identifier has permitted ad delivery. The secure private platform may determine whether any ad has been associated with the user's system-generated user identifier (and ensure any other user-defined settings permit delivery of this ad), indicating that the ad was targeted for that user based on the user's profiling data. If so, then the secure private platform may transmit the ad to the website for presentation to the user.

Any clicks or interactions of the ad may be tracked for payment purposes. For instance, the advertiser 140 may be charged per click according to the ad budget in a request, the website may be provided with a fee for serving the ad, and the user may be provided with a reward for agreeing to permit use of his profiling data.

Untargeted Delivery via the Advertising Queue

Some requests may not require use of personal identifying information and not target certain users. In this case, processing may continue as with the targeted delivery via an advertising queue, but without ads being previously associated with a system-generated user identifier. For example, the agent on a website may detect a system-generated user identifier and transmit the identifier to the secure private platform. This indicates to the secure private platform that a user is browsing an affiliate website. The secure private platform may select an ad from a general ad queue (one that is not targeted to users having particular profiling data), check any user-defined settings that permit delivery of the ad, and transmit the ad to the website if delivery is permitted to that user.

Whichever handler 38 is used to process a request, the secured private platform will deliver advertisements to users who have permitted used of their profiling data while not providing an personal identifying information of the user to the advertiser.

Electronic Ad Marketplace

The electronic ad marketplace 40 may provide electronic interfaces and tools for advertisers 140 and publishers 150 to transparently participate in an electronic advertising marketplace. For example, electronic ad marketplace 40 may receive advertisement information from advertisers 140. The advertisement information may include the advertisement content in any format (e.g., video, audio, text, graphics, etc.), an electronic address such as a Uniform Resource Locator (URL) to the advertisement content, metadata relating to the advertisement (e.g., size, type, format, etc.), advertisement campaign parameters, and/or other information relating to the advertisement that the advertiser 140 would like to be provided to users via the secure private platform. The electronic ad marketplace 40 may publish the advertisement information, such as by writing the advertisement information to the public blockchain 12.

The electronic ad marketplace 40 may receive publisher information from publishers 150. The publisher information may include an electronic address of the publisher (such as a URL of the publisher's website), a location of the space allocation on the website for advertisements, size allocated for the advertisement (such as absolute dimensions, relative dimensions, etc.), publishing parameters such as a minimum asking price for publishing an ad, subject matter for a given site, and/or other information relating to the publisher. The electronic ad marketplace 40 may publish the publisher information, such as by writing the publisher information to the public blockchain 12.

In an implementation, electronic ad marketplace 40 may generate one or more smart contracts based on the advertisement information, the publisher information, reward information, and/or other information that may be used to self-execute an agreement between parties. For example, a smart contract may encode one or more rules that execute terms of a contract if the campaign parameters have been satisfied, the publisher's parameters have been satisfied, the advertisement has been transmitted to a user, which may occur via a publisher. The terms of the contract may include the bid amount an advertiser is willing to pay, an amount to be paid to a publisher, an amount to be rewarded to a user for permitting use of his profiling data, and/or other terms.

Contract Fulfillment

The ad delivery service 52 may deliver ads to a user. For example, the ad delivery service 52 may execute one or more smart contracts. Accordingly, the ad delivery service 52 may provide an ad to the user depending on the state of each of the ad queues, which were populated by respective handlers 38, and the trigger conditions encoded by one or more of the smart contracts.

In some instances, the engagement monitor 54 may monitor user engagement with an advertisement. For instance, user engagement may include having been presented with an advertisement (such as impression), clicking on a link, inputting a command to retrieve content associated with the advertisement, or otherwise interacting with a call-to-action of the advertisement. The engagement monitor 54 may collect metrics relating to the engagement, such as a number of impressions, a click-through-rate, a cost-per-click, a cost-per-impression, and/or other metrics. Such metrics may be stored as engagement data in the anonymized database 14. The engagement data may be stored in association with an anonymous identifier. In this manner, the user may permit (or deny) access to this engagement data as well. In some instances advertisers 140 and others may query the anonymous engagement information and may build audiences based on the engagement information or other profiling data.

Satisfying the terms of Ad Marketplace smart contracts will also depend on the integrity of the immutable record and whether or not all sides of the contract have not been altered externally from the originally agreed on assets. Smart contracts created in this marketplace will be automatically invalid if, for example, the checksum and/or properties of the image that was defined for the marketplace has changed.

Whether the ad delivery service 52 transmitted the ad through a specific channel or the ad queue, the blockchain processor 50 may generate a transaction that includes a payload that specifies that the advertisement was transmitted to and/or interacted by the user. For example, the payload may indicate that a user associated with the anonymous identifier was provided with an advertisement. Furthermore, the blockchain processor 50 may cause appropriate debits from the advertiser, credits to any delivery platform, and any rewards for the user to be provided. These transactions may be self-executed according to a predefined smart contract and recorded on a public distributed ledger. In this manner, the advertiser can verify that the advertisement was delivered, open consult the fee provided to any delivery platform, and also verify rewards provided to the user. Other relevant stakeholders may similarly verify the transactions as well.

Each request handler may be specifically compiled or otherwise instantiated by the system. Thus, new handlers may not be added unless specifically compiled or instantiated, improving security of the secured private platform.

User Scoring

In an implementation, the user scoring engine 55 may generate a user score that indicates an assessment of the quality of the data known about the user. The user score may be expressed as a numeric score, a letter score, and/or other type of score that can quantitatively assess the quality of the data known about the user. For example, the user score may reflect the amount of profiling data such as browser data, connected networks, purchase and interests data, demographic data, and/or other information known about the user. Generally speaking, the more that is known about the user, a value of the user score will be greater than if less is known about the user.

In an implementation, the user score may be used to affect a reward provided to the user. For example, a user having a greater value user score may be provided with a greater reward than a user having a lower value user score. In some instances, the user score may be used by advertisers to screen audiences. For example, an advertiser may target users that have a minimum user score. In this manner, the advertiser may target users whose quality of data meets a certain value.

To an extent, the user may influence his user score by permitting more access to the user's data, using the system to conduct online activities, and/or otherwise providing more access to the user's data. In this manner, the user may seek to maximize his rewards by allowing more access, or more tightly control such access but receive less rewards. In this manner, the system facilitates control by the user of the user's data while incentivizing the user to permit greater levels of access.

Publisher API and Tools

In an implementation, the publisher API 56 may provide interfaces and tools for publishers to customize the experience for users browsing their site. For example, the API 56 may communicate with publisher agents (such as Javascripts or other application operating on a user device) operating at the publisher sites. The secure private platform may provide the publisher agents to a publisher 150, which implement the agents on its sites.

The publisher agents may be customized to interact with users who visit (in other words is in electronic communication with) a publisher's 150 site. For instance, a publisher agent may be customized to ask a user whether they would like to share a reward in exchange for permission to serve ads on the site. If the user agrees, the publisher 150 and the user may share rewards resulting from ad delivery and/or interaction. The publisher agent may be customized to ask a user to participate in the secure private platform and offer to register the user to enroll to use the platform. In this manner, the user may be enrolled and provide permission to use profiling data. In some instances, the publisher agent may perform similar functions as the profiling agents 126, in that a system-generated user identifier may be stored and detected on the user device 120.

To facilitate the foregoing, in an implementation, the publisher agent may determine whether a user is an enrolled user. If yes, then the publisher agent may obtain the system-generated user identifier. Alternatively or additionally, the publisher agent may check on a user's status via a call to publisher API 56 to obtain the status. The publisher agent may determine whether the publisher's site is whitelisted or blacklisted. If whitelisted, the publisher agent may receive, from the publisher API 56, a meta payload including a system-generated user identifier of the user, approved domains and subdomains, whether payment has been approved for the user, custom domain information (such as whether the user is a subscriber to the site), and/or other information. If the site is blacklisted, the publisher agent may request that the user whitelist the site. In some instances, the publisher agent may request that the user remove or add paywall, which is a subscription service required to access a site. If the paywall is added, then ads may be removed. If a paywall is removed, then the user may be asked to permit presentation of ads. In some instances, the whitelists and blacklists may be input by a user as part of the user's settings. In this manner, the user may customize which publishers or others may track and/or use the user's data. In some instances, the user may customize whether publishers or others may track and/or use the user's data on a global level that affects all publishers. In this manner, the user may specify privacy settings on a micro or macro (global) level. By doing so, the system may also provide an advantage of complying with certain privacy regulations, such as the General Data Protection Regulation of the European Union.

In some instances, the publisher API 56 may provide tools for the publisher to interface with the electronic ad marketplace 40. For instance, the publisher 150 may be provided with calls to the publisher API 56 to view and select offers to place ads on a site of the publisher. In this manner, publishers may be directed connected to advertisers. In some of these instances, agreements among pricing may be enforced by smart contracts as before, but manually agreed upon first before automatic execution and recordation.

User Device 120

The user device 120 may be operated by a user to interact with the private and public blockchains (10, 12) and conduct activity that is monitored and stored in the anonymized database 14. For instance, the user device 120 may be programmed by a private wallet 122, a public wallet 124, one or more agents 126, and/or other components. The private wallet 122 may be used to interact with data pertaining to the user device 120 on the private blockchain 10. For instance, the private wallet 122 may access a private key to decrypt data on the blockchain that is intended to be accessed only by the holder of the private key. The private wallet 122 may store a blockchain address, which is used by the private blockchain 10 to identify the private wallet. The public wallet 124 may enable access to the public blockchain 12. For instance, the public wallet 124 may be used to view a user's reward balance, interactions with advertisements, and/or other public information stored on the public blockchain 10.

The one or more agents 126 may include programs that monitor activity on the user device 120 and report this activity to the computer system 110. For example, an agent 126 may include a browser extension, a mobile application, a platform-specific application (such as an electronic shopping application), and/or other types of user application that can report user activity that may be used as profiling data. As one example, the browser extension may be configured as a script that transmits browser history information and a device identifier to the computer system 110, which stores the browser history information anonymously linked to the device identifier in the anonymous database 14.

In some instances, the one or more agents 126 may store a device identifier of an enrolled device. For instance, an agent 126 may store the device identifier as a browser cookie. If a device identifier is not stored, the agent 126 may determine whether the device is enrolled to use the system. If so, then the device identifier may be obtained from the secure private platform and stored as a cookie. If the agent 126 determines that the device is not enrolled to use the system, the agent 126 may request that the user enroll the device.

Figure 4:
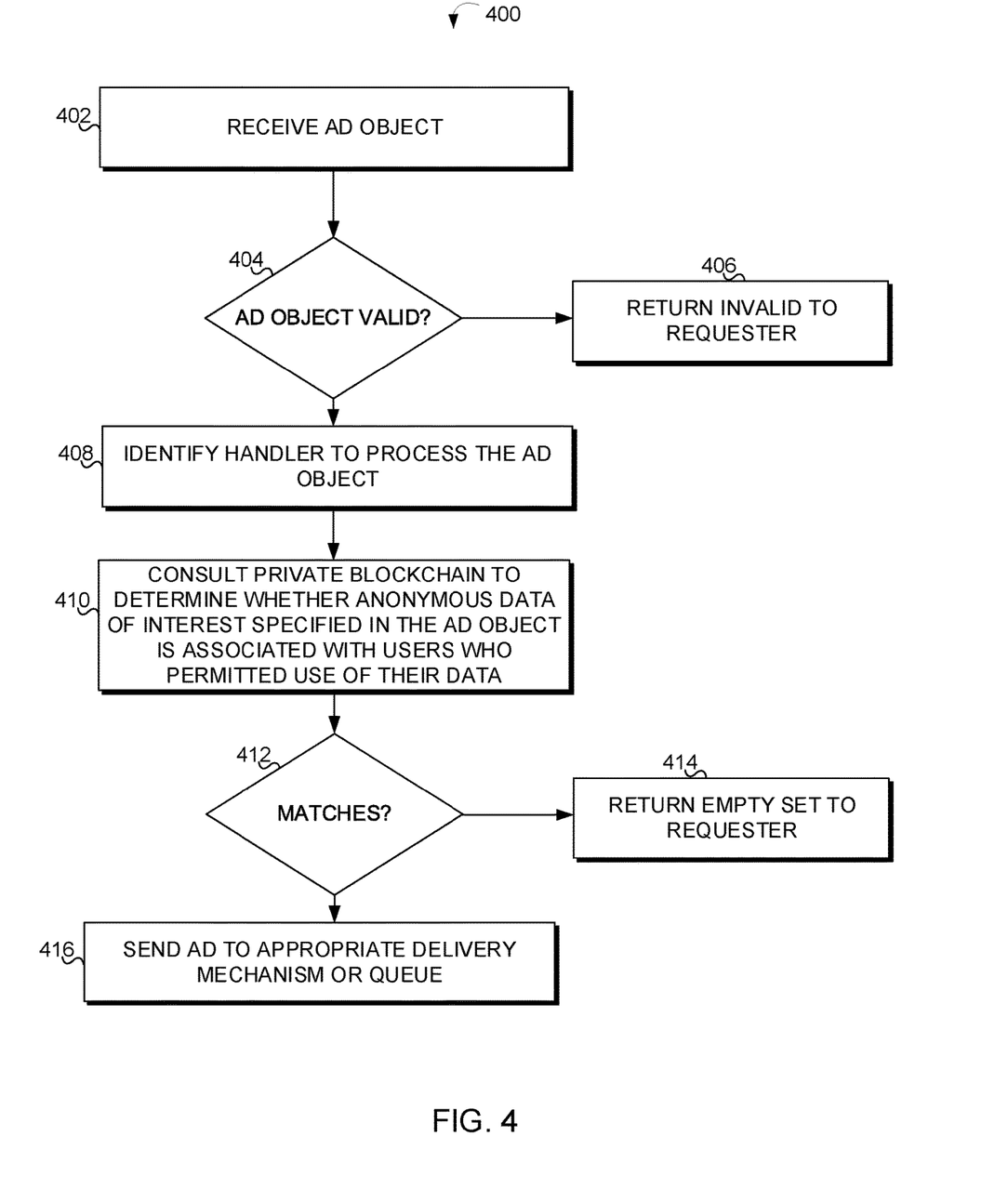
FIG. 4 illustrates an example of a process of matching anonymous user identifiers specified in an audience order with users that have permitted use of their profiling data, according to an implementation of the invention.

FIG. 4 illustrates an example of a process 400 of matching anonymous user identifiers specified in an audience order with users that have permitted use of their profiling data, according to an implementation of the invention.

In an operation 402, process 400 may include receiving an ad object. The ad object may specify an audience order from an advertiser 140. The ad object may specify, among other things, a listing of unique record identifiers of interest. As previously noted, each unique record identifier identifies particular profiling data, but does not identify an individual. Thus the ad object expresses an interest in users that fit the profiling data, even if the advertiser 140 does not know who those users are.

In an operation 404, process 400 may include determining whether the ad object is valid. For example, each type of valid ad object may be handled by a particular handler 38, which expects certain types of data from known advertisers 140.

In an operation 406, process 400 may include returning an invalid request to the requester if the ad object is invalid.

In an operation 408, process 400 may include identifying a handler to process the ad object. It should be noted that the identified handler may perform further validations on the ad object.

In an operation 410, process 400 may include consulting a private blockchain to determine whether the anonymous profiling data records are associated with users who have permitted use of their profiling data (and if applicable whether the users have permitted use of the specific type of profiling data being matched).

In an operation 412, process 400 may include determining whether any matches exist.

In an operation 414, process 400 may include returning an empty dataset or other indication that no matches were found. In other words, the users associated with the anonymous profiling data records of interest to the requesting advertiser 140 have not permitted access to such records.

In an operation 416, process 400 may include causing ads to be transmitted to users that have permitted use of the requested profiling data. For example, process 500 may email users with the advertisement if the ad object specified that emails should be sent to users who have permitted use of the profiling data. If the ad object has not specified a channel over which to deliver the ad, then the ad may be included an in ad queue to be delivered to relevant users when they visit a participating site (such as a website of a publisher 150).

Operation 416 may also include creating aggregate analytics data, data analysis or report from the profiling data. For example, process 500 may first generate a list of users who have permitted use of the profiling data that match specified criteria and then count, sum, average or calculate statistical or marketing metrics (like lifetime value of people that make home and garden purchases). The result may be to create an html report of the aggregated data with a reference handle based on the audience request. This report can then be accessed by the advertiser that requested the audience data.

Although illustrated in FIG. 1 as a single component, a computer system 110 may include a plurality of individual components (such as computer devices) each programmed with at least some of the functions described herein. The one or more processors 20 may each include one or more physical processors that are programmed by computer program instructions. The various instructions described herein are provided for illustrative purposes. Other configurations and numbers of instructions may be used, so long as the processor(s) 20 are programmed to perform the functions described herein.

Furthermore, it should be appreciated that although the various instructions are illustrated in FIG. 1 as being colocated within a single processing unit, in implementations in which processor(s) 20 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 20 may be programmed by one or more additional instructions that may perform some or all of the functionality attributed herein to one of the instructions.

The various instructions described herein may be stored in a storage device 22, which may comprise random access memory (RAM), read only memory (ROM), and/or other memory. The storage device may store the computer program instructions (such as the aforementioned instructions) to be executed by processor 20 as well as data that may be manipulated by processor 20. The storage device may comprise one or more non-transitory machine-readable storage media such as floppy disks, hard disks, optical disks, tapes, or other physical storage media for storing computer-executable instructions and/or data.

For example, the various information described herein may be stored using one or more databases. The databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The components illustrated in FIG. 1 may be coupled to one another via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing figures, different numbers of entities than those depicted may be used. Furthermore, according to various implementations, the components described herein may be implemented in hardware and/or software that configure hardware.

The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for building anonymized databases and linking anonymous profiling data records of the anonymized databases to users who have granted permission to use user data associated with the users, the system comprising:
   an anonymized database configured to store anonymized profiling data of users;
   a computer system comprising one or more physical processors programmed to execute stored instructions to:
      assign a user identifier to a user, wherein the user identifier is privately accessible at the computer system and inaccessible to advertisers;
      assign a first device identifier to a first device of the user;
      receive a grant to use first profiling data of the user;
      generate, in a public blockchain, a public block that records an indication of the grant, the public blockchain comprising a first one or more nodes connected to one another using a first one or more connection protocols, and wherein each of the first one or more nodes stores a public distributed ledger that can be read from and written to by each node, the public block being recorded in the public distributed ledger;
      store a link between the user identifier and the first device identifier based at least in part on the grant;
      receive the first profiling data and the first device identifier;
      generate a first anonymous profiling data record in the anonymized database, the first anonymous profiling data record comprising the first profiling data and a first unique record identifier; and
      generate, in a private blockchain, a private block that records an association between the user identifier and the first unique record identifier based at least in part on an existence of the link, the private blockchain comprising a second one or more nodes connected to one another using a second one or more connection protocols, wherein each of the second one or more nodes stores a private distributed ledger in which the private block is recorded, and wherein the private blockchain enforces credentialed access to the private distributed ledger.

2. The system of claim 1, wherein the computer system is further programmed to:
   determine that the first unique record identifier is recorded in the private blockchain; and,
   determine, based at least in part on the first unique record identifier being recorded in the private blockchain, that the user identifier associated with the first unique record identifier is associated with a user who has permitted use of the first profiling data.

3. The system of claim 2, wherein the grant is received at a first time, and wherein the computer system is further programmed to:
   receive a revocation of the grant at a second time after the first time;
   remove the link responsive to the revocation;
   receive second profiling data and the first device identifier at a third time after the revocation;

generate a second anonymous profiling data record comprising the second profiling data and a second unique record identifier, wherein the second profiling data is not linked to any user.

4. The system of claim 3, wherein each of the first profiling data and the second profiling data is generated based on corresponding activity associated with the first device.

5. The system of claim 4, wherein the second profiling data is generated based on activity associated with the first device that occurs after removal of the link.

6. The system of claim 1, wherein the first profiling data comprises at least one of user behavioral data, user demographic data, or user location data.

7. The system of claim 6, wherein the first profiling data comprises the user location data, and wherein the user location data comprises at least one of a current location of the first device or a historical location of the first device.

8. The system of claim 1, wherein the computer system is further programmed to:
store, in the public blockchain, a date of the grant to use the first profiling data, a type of personally identifiable information in the first profiling data that the user has permitted to be used, and a duration of the grant.

9. The system of claim 1, wherein the grant is a first grant and the first profiling data is generated from activity of the first device, and wherein the computer system is further programmed to:
determine that a second device of the user has accessed a participating platform;
receive a second grant to use second profiling data of the user, wherein the second profiling data is generated from activity of the second device;
send a request to the second device for the user identifier;
receive, from the second device, the user identifier;
assign a second device identifier to the second device; and
store a link between the user identifier and the second device identifier based at least in part on the second grant.

10. The system of claim 9, wherein the computer system is further programmed to:
receive a revocation of the first grant; and
remove the link between the user identifier and the first device identifier based at least in part on the revocation of the first grant.

11. A method for building anonymized databases and linking anonymous profiling data records of the anonymized databases to users who have granted permission to use user data associated with the users, the method comprising:
assigning a user identifier to a user, wherein the user identifier is privately accessible at the computer system and inaccessible to advertisers;
assigning a first device identifier to a first device of the user;
receiving a grant to use first profiling data of the user;
generating, in a public blockchain, a public block that records an indication of the grant, the public blockchain comprising a first one or more nodes connected to one another using a first one or more connection protocols, and wherein each of the first one or more nodes stores a public distributed ledger that can be read from and written to by each node, the public block being recorded in the public distributed ledger;
storing a link between the user identifier and the first device identifier based at least in part on the grant;
receiving the first profiling data and the first device identifier;
generating a first anonymous profiling data record in an anonymized database configured to store anonymized profiling data of users, the first anonymous profiling data record comprising the first profiling data and a first unique record identifier; and
generating, in a private blockchain, a private block that records an association between the user identifier and the first unique record identifier based at least in part on an existence of the link, the private blockchain comprising a second one or more nodes connected to one another using a second one or more connection protocols, wherein each of the second one or more nodes stores a private distributed ledger in which the private block is recorded, and wherein the private blockchain enforces credentialed access to the private distributed ledger.

12. The method of claim 11, further comprising:
determining that the first unique record identifier is recorded in the private blockchain; and,
determining, based at least in part on the first unique record identifier being recorded in the private blockchain, that the user identifier associated with the first unique record identifier is associated with a user who has permitted use of the first profiling data.

13. The method of claim 12, wherein the grant is received at a first time, the method further comprising:
receiving a revocation of the grant at a second time after the first time;
removing the link responsive to the revocation;
receiving second profiling data and the first device identifier at a third time after the revocation;
generating a second anonymous profiling data record comprising the second profiling data and a second unique record identifier, wherein the second profiling data is not linked to any user.

14. The method of claim 13, wherein each of the first profiling data and the second profiling data is generated based on corresponding activity associated with the first device.

15. The method of claim 14, wherein the second profiling data is generated based on activity associated with the first device that occurs after removal of the link.

16. The method of claim 11, wherein the first profiling data comprises at least one of user behavioral data, user demographic data, or user location data.

17. The method of claim 16, wherein the first profiling data comprises the user location data, and wherein the user location data comprises at least one of a current location of the first device or a historical location of the first device.

18. The method of claim 11, further comprising:
storing, in the public blockchain, a date of the grant to use the first profiling data, a type of personally identifiable information in the first profiling data that the user has permitted to be used, and a duration of the grant.

19. The method of claim 11, wherein the grant is a first grant and the first profiling data is generated from activity of the first device, the method further comprising:
determining that a second device of the user has accessed a participating platform;
receiving a second grant to use second profiling data of the user, wherein the second profiling data is generated from activity of the second device;
sending a request to the second device for the user identifier;
receiving, from the second device, the user identifier;
assigning a second device identifier to the second device; and storing a link between the user identifier and the second device identifier based at least in part on the second grant.

20. The method of claim 19, further comprising:

receiving a revocation of the first grant; and removing the link between the user identifier and the first device identifier based at least in part on the revocation of the first grant.

21. The system of claim 1, wherein, when storing the link between the user identifier and the first device identifier, the computer system is further programmed to:

create the link between the user identifier and the first device identifier; and store the link between the user identifier and the first device identifier in a linking database.

22. The method of claim 11, wherein storing the link between the user identifier and the first device identifier further comprises:

creating the link between the user identifier and the first device identifier; and storing the link between the user identifier and the first device identifier in a linking database.

\* \* \* \* \*